US012776331B2

(12) United States Patent
Aydin et al.

(10) Patent No.: US 12,776,331 B2
(45) Date of Patent: Oct. 27, 2026

(54) METHOD AND SYSTEM FOR ENCODING AND DECODING DATA IN AUDIO

(71) Applicant: SOUNDPAYS CORP., Toronto (CA)

(72) Inventors: Aybar Aydin, Oakville (CA); Mark Madsen, Edmonton (CA); Douglas Sutherland, Brampton (CA); Orest Sushko, Toronto (CA)

(73) Assignee: SOUNDPAYS CORP., Toronto (CA)

( * ) Notice: Subject to any disclaimer, the term of this patent is extended or adjusted under 35 U.S.C. 154(b) by 0 days.

(21) Appl. No.: 17/842,511

(22) Filed: Jun. 16, 2022

(65) Prior Publication Data

US 2022/0406322 A1 Dec. 22, 2022

Related U.S. Application Data

(60) Provisional application No. 63/211,166, filed on Jun. 16, 2021.

(51) Int. Cl.

*G10L 19/26* (2013.01)
*G10L 19/02* (2013.01)
*G10L 25/51* (2013.01)

(52) U.S. Cl.

CPC ............ *G10L 19/265* (2013.01); *G10L 19/02* (2013.01); *G10L 25/51* (2013.01)

(58) Field of Classification Search

CPC ....... G10L 19/265; G10L 19/02; G10L 25/51; G10L 19/018

See application file for complete search history.

(56) References Cited

U.S. PATENT DOCUMENTS

| | | | | |
|---|---|---|---|---|
| 5,355,161 | A * | 10/1994 | Bird | H04N 21/812 725/18 |
| 6,173,163 | B1 * | 1/2001 | Northcutt | H03F 1/0261 455/127.2 |
| 6,631,165 | B1 * | 10/2003 | Lambert | H04L 27/00 375/259 |
| 9,214,973 | B1 * | 12/2015 | Venkatesh | H03H 11/04 |
| 2003/0185411 | A1 * | 10/2003 | Atlas | G10L 21/0208 381/98 |

(Continued)

FOREIGN PATENT DOCUMENTS

DE 69530865 T2 * 3/2004

OTHER PUBLICATIONS

Dutilleux, P. (Nov. 1998). Filters, delays, modulations and demodulations: A tutorial. In Proceedings of DFX98, Digital Audio Effects Workshop, Barcelona, Spain (pp. 4-11) (Year: 1998).*

(Continued)

*Primary Examiner* — Philip H Lam

(57) ABSTRACT

Methods and systems for encoding and decoding data in an audio channel are provided. At least one notch attribute for each of a set of notches to be applied to a source audio channel corresponding to data to be encoded is determined. The data is encoded by applying notch-filtering to the source audio channel to create a modified audio channel having the set of notches having the at least one notch attribute. The notches in the modified audio channel are then analyzed to determine at least one characteristic of each of the notches, and data is then decoded from the at least one characteristic of each of the notches.

14 Claims, 12 Drawing Sheets

(56) References Cited

U.S. PATENT DOCUMENTS

| | | | | |
|---|---|---|---|---|
| 2005/0028189 | A1* | 2/2005 | Heine | H04H 20/31 725/112 |
| 2013/0204415 | A1* | 8/2013 | Fregley | G06Q 30/02 700/94 |
| 2015/0032239 | A1* | 1/2015 | Neuhauser | G10L 19/018 700/94 |
| 2015/0288824 | A1* | 10/2015 | Quiers | H04L 65/762 370/260 |
| 2017/0236521 | A1* | 8/2017 | Chebiyyam | G10L 19/0212 381/2 |
| 2019/0115046 | A1* | 4/2019 | Lesso | G10L 25/03 |
| 2020/0162852 | A1* | 5/2020 | Xu | G11B 27/10 |
| 2021/0366504 | A1* | 11/2021 | Waller, Jr. | G10L 25/18 |
| 2022/0246161 | A1* | 8/2022 | Verbeke | G10L 21/034 |

OTHER PUBLICATIONS

Rämö, J., & Välimäki, V. (2012). Digital augmented reality audio headset. Journal of Electrical and Computer Engineering, 2012. (Year: 2012).*

Liu, J., & Declercq, N. F. (2017). Pulsed ultrasonic comb filtering effect and its applications in the measurement of sound velocity and thickness of thin plates. Ultrasonics, 75, 199-208. (Year: 2017).*

Tan, L., Jiang, J., & Wang, L. (2012). Pole-radius-varying IIR notch filter with transient suppression. IEEE transactions on instrumentation and measurement, 61(6), 1684-1691. (Year: 2012).*

Kocoń, S., & Piskorowski, J. (Aug. 2012). A concept of time-varying FIR notch filter based on IIR filter prototype. In 2012 17th International Conference on Methods & Models in Automation & Robotics (MMAR) (pp. 91-95). IEEE. (Year: 2012).*

R. Walker,—Audio watermarkingll. BBC Research & Development, White Paper WHP 057 (Year: 2004).*

Harrison, C., Xiao, R., & Hudson, S. (Oct. 2012). Acoustic barcodes: passive, durable and inexpensive notched identification tags. In Proceedings of the 25th annual ACM symposium on User interface software and technology (pp. 563-568). (Year: 2012).*

Healy, R. (2010). Digital audio watermarking for broadcast monitoring and content identification (Doctoral dissertation, National University of Ireland, Maynooth.).—discloses application of notch filter in development of watermarking scheme. (Year: 2010).*

* cited by examiner

METHOD AND SYSTEM FOR ENCODING AND DECODING DATA IN AUDIO

CROSS-REFERENCE TO RELATED APPLICATION

This application claims the benefit of U.S. Provisional Patent Application No. 63/211,166, filed Jun. 16, 2021, the contents of which are incorporated herein by reference in their entirety.

FIELD

The specification relates generally to data communications, and, in particular, to a method and system for encoding and decoding data in audio.

SUMMARY OF THE DISCLOSURE

In one aspect, there is provided a method for encoding data in an audio channel, comprising: determining at least one notch attribute for each of a set of notches to be applied to a source audio channel corresponding to data to be encoded; and modifying the source audio channel to create a modified audio channel by applying notch-filtering for each of the set of notches having the at least one notch attribute to the audio channel to encode the data. For example, the modifying step may include encoding the data by applying notch-filtering to the source audio channel to create a modified audio channel having the set of notches having the at least one notch attribute.

The at least one notch attribute can include a frequency or a frequency range. The frequency can be selected from a set of candidate frequencies that are spaced along a frequency domain.

The at least one notch attribute can include a time position. The time position can be selected from a set of candidate time positions that are temporally spaced.

The set of candidate time positions can be temporally equally spaced.

The at least one notch attribute can include a time duration.

The at least one notch attribute can include an attenuation level.

The method can further comprise communicating the modified audio channel to a device comprising an audio transducer for playback of an audio channel.

The method can further comprise storing the modified audio channel.

In another aspect, there is provided a method for decoding data in an audio channel, comprising: analyzing a modified audio channel to identify a set of notches present in the modified audio channel; determining at least one notch attribute for each of the set of notches; and decoding data encoded in the modified audio channel from the at least one notch attribute of each of the set of notches.

The at least one notch attribute can include a frequency or a frequency range. The frequency can be selected from a set of candidate frequencies that are spaced along a frequency domain.

The at least one notch attribute can include a time position. The time position can be selected from a set of candidate time positions that are temporally spaced.

The set of candidate time positions can be temporally equally spaced.

The at least one notch attribute can include a time duration.

The at least one notch attribute can include an attenuation level.

The method can further comprise, before analyzing the modified audio channel, receiving the modified audio channel at a device comprising a microphone for registering the modified audio channel.

The method can further comprise comparing the modified audio channel to a source audio channel from which the modified audio channel was generated via the set of notches to identify the set of notches.

In a further aspect, there is provided a system for encoding data in audio, comprising: at least one processor; a storage storing computer-executable instructions that, when executed by the at least one processor, cause the system to: determine at least one notch attribute for each of a set of notches to be applied to a source audio channel corresponding to data to be encoded; and modify the source audio channel to create a modified audio channel by applying notch-filtering for each of the set of notches having the at least one notch attribute to the audio channel to encode the data. For example, the modifying step may including encoding the data by applying notch-filtering to the source audio channel to create a modified audio channel having the set of notches having the at least one notch attribute. The system further includes at least one audio transducer which the at least one processor is operatively connected to for playback of the modified audio channel.

In yet another aspect, there is provided a system for decoding data in audio, comprising: at least one processor; at least one audio transducer operably connected to and controlled by the at least one processor; and a storage storing computer-executable instructions that, when executed by the at least one processor, cause the system to: analyzing a modified audio channel to identify a set of notches present in the modified audio channel; determining at least one notch attribute for each of the set of notches; and decoding data encoded in the modified audio channel from the at least one notch attribute of each of the set of notches.

In still a further aspect, there is provided a method for encoding data in an audio channel, comprising: determining a position for each of a set of notches to be applied to a source audio channel; determining a transformation to be applied to a segment of the source audio channel adjacent to each position to be notch filtered; modifying the source audio channel to create a modified audio channel by: applying each of the set of notches at the position; and transforming the segment.

Other technical advantages may become readily apparent to one of ordinary skill in the art after review of the following figures and description.

BRIEF DESCRIPTIONS OF THE DRAWINGS

For a better understanding of the embodiment(s) described herein and to show more clearly how the embodiment(s) may be carried into effect, reference will now be made, by way of example only, to the accompanying drawings in which.

Figure 1:
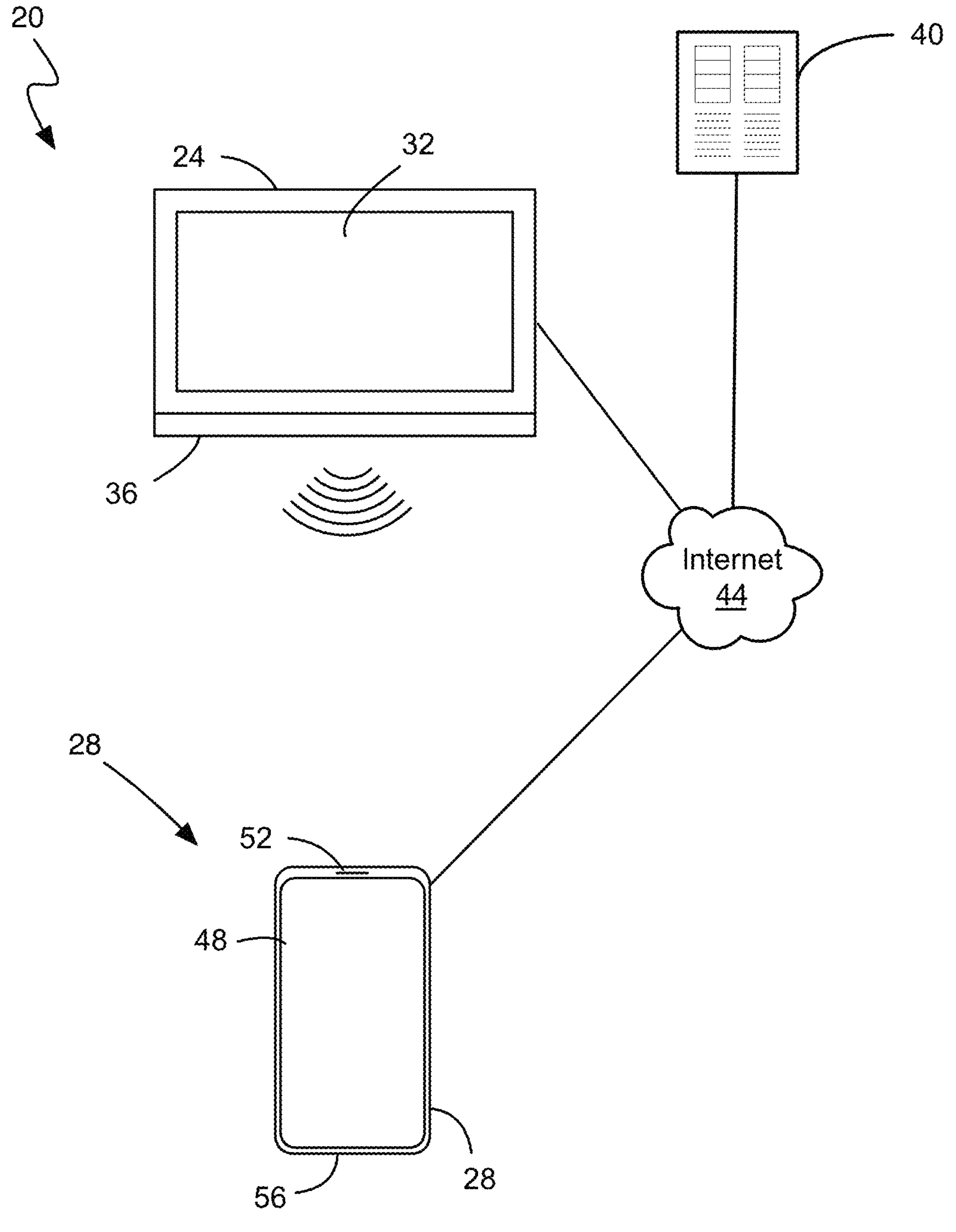
FIG. 1 shows a system for encoding and decoding data in audio in accordance with one embodiment thereof.

Unless otherwise specifically noted, articles depicted in the drawings are not necessarily drawn to scale.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

A method and system for encoding and decoding data in audio is disclosed. In the method, some or all of a source audio channel is shifted by a sequence of time deltas so that some temporal segments of the audio channel are temporally shifted more than other temporal segments. In one embodiment, the time deltas are sufficiently small so that they are indistinguishable to a human when played back in comparison to the source audio channel.

A system 20 for encoding and decoding data in audio is shown in FIG. 1. The system 20 includes a television set 24 in communication with an encoding computer system, and a decoding computer system in the form of a mobile device 28. The television set 24 has a display 32 and an audio transducer in the form of a loudspeaker 36. The loudspeaker 36 can be any type of suitable audio transducer for playback of an audio channel. The display 32 can be any type of display suitable for presenting images, such as an LED display, an LCD display, an OLED display, etc. The encoding computer system is a server 40 which is in communication with the television set 24 via a data communications network, cable, or other medium. In the illustrated embodiment, the data communications network or medium includes the Internet 44. In other embodiments, any other type of audio transducer can be employed to play back the audio channel.

The mobile device 28 is a smartphone or the like, and includes a touchscreen display 48, an audio transducer in the form of a loudspeaker 52, and a microphone 56. The microphone 56 can be any suitable microphone for registering audio.

In this illustrated embodiment, the television set 24 presents one or more images or videos of advertising or information. Simultaneously, an audio channel is played by the loudspeaker 36 of the television set 24. The audio channel carries data encoded in a manner as is described herein. The encoded data can be any set of data that is encodable in an audio channel using the provided approach, such as, for example, a uniform resource locator (URL) for a website associated with the advertising or information, additional information about the advertised product or service, a reference identifier for the advertising or a URL at which the advertising is available, etc. Still other types of data that can be encoded using the described system will occur to those skilled in the art. In the illustrated embodiment, the encoded set of data is a reference identifier for a website having a URL associated with the advertised product or service. The reference identifier can be used to either locally or remotely look up the corresponding URL.

The mobile device 28 is sufficiently proximal to the television set 24 so that the microphone 56 of the mobile device 28 registers the audio channel played by the loudspeaker 36 of the television set 24. As the audio channel is being received by the mobile device 28 or thereafter, the mobile device 28 decodes the set of data within the audio channel. The set of data, once decoded, can then be acted upon, stored, or communicated to one or more other computing devices. Where the decoded set of data is a reference identifier, the mobile device 28 can either look up or request from a server the corresponding URL and act on it, causing the mobile device 28 to pass the URL to a default web browser on the mobile device 28 to thereby request the web page/resources identified by the URL. The decoded set of data can include a document, such as a PDF, an image, formatted or unformatted text, etc. Acting on the document can cause the mobile device 28 to pass the document to a default handler application for the received content.

The encoding computer system can be any suitable computing device or set of computing devices that are in communication with one another for encoding a set of data in an audio channel and having or being connected, either locally or remotely, to one or more audio transducers for playing the audio channel. While in this embodiment, the encoding computer system (that is, the server 40) is shown as a single separate physical computing device that provides audio channels for playback to the television set 24, in other embodiments, the encoding computer system can include an audio transducer to play back the audio channels. Further, any other type of device having a suitable audio transducer can be communicated with by the encoding computer system to play back the audio channels.

The decoding computer system can be any suitable computing device or set of computing devices that are in communication with one another and having or being connected to one or more microphones for registering the audio channel. Alternatively, the decoding computer system can be connected to another device that has one or more microphones for registering the audio channel and communicating the registered audio channel to the decoding computer system. Upon registering or receiving the registered audio channel, the decoding computer system is configured to decode the set of data in the audio channel and decode the set of data from the registered audio channel.

Figure 2:
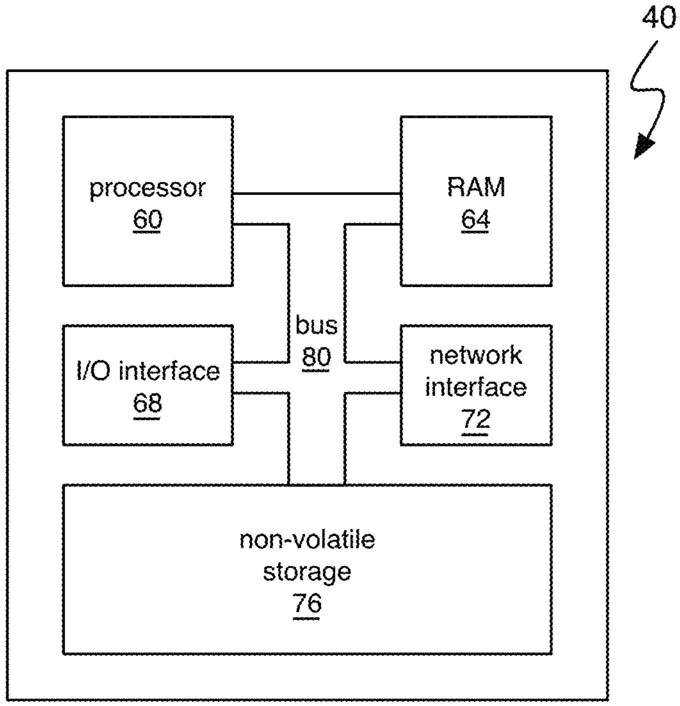
FIG. 2 is a schematic diagram showing various physical components of a first computing device for encoding data in audio in the system of FIG. 1.

FIG. 2 shows various physical elements of the server 40. As shown, the server 40 has a number of physical and logical components, including a processor 60, random access memory ("RAM") 64, an input/output ("I/O") interface 68, a network interface 72, non-volatile storage 76, and a local bus 80 enabling the processor 60 to communicate with the other components. The processor 60 executes at least an operating system, and an application for encoding a set of data as described herein. The RAM 64 provides relatively responsive volatile storage to the processor 60. The I/O interface 68 allows for input to be received from one or more devices, such as a keyboard and mouse, and outputs information to output devices such as a connected display (not shown). The network interface 72 permits communication with other computing devices over computer communication networks such as the Internet 44. In the embodiment illustrated in FIG. 1, the server 40 is in communication with the televisions set 24 via the network interface 72. The non-volatile storage 76 stores the operating system and applications, including computer-executable instructions for implementing a data encoding program as described below. During operation of the server 40, the operating system, the applications, and the set of data may be retrieved from non-volatile storage 76 and placed in RAM 64 to facilitate execution.

Figure 3:
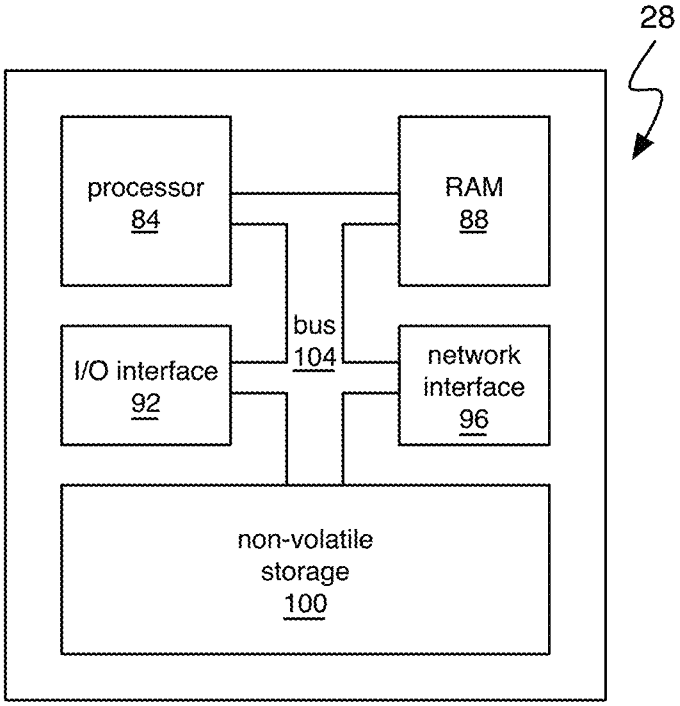
FIG. 3 is a schematic diagram showing various physical components of a second computing device for decoding data in audio in the system of FIG. 1.

FIG. 3 shows various physical elements of the mobile device 28. As shown, the mobile device 28 has a number of physical and logical components, including a processor 84, random access memory ("RAM") 88, an input/output ("I/O") interface 92, a network interface 96, non-volatile storage 100, and a local bus 104 enabling the processor 84 to communicate with the other components. The processor 84 executes at least an operating system, and an application for decoding data as described herein. The RAM 88 provides relatively responsive volatile storage to the processor 84. The I/O interface 92 allows for input to be received from one or more devices, such as the controls and touchscreen display 48 of the mobile device 28, and outputs information to output devices, such as the touchscreen display 48 and the loudspeaker 52. The network interface 96 permits communication with other computing devices over computer communication networks such as the Internet 44. Non-volatile storage 100 stores the operating system and applications, including computer-executable instructions for implementing the data encoding. During operation of the mobile device 28, the operating system, the applications, and the set of data may be retrieved from non-volatile storage 100 and placed in RAM 88 to facilitate execution.

Figure 4:
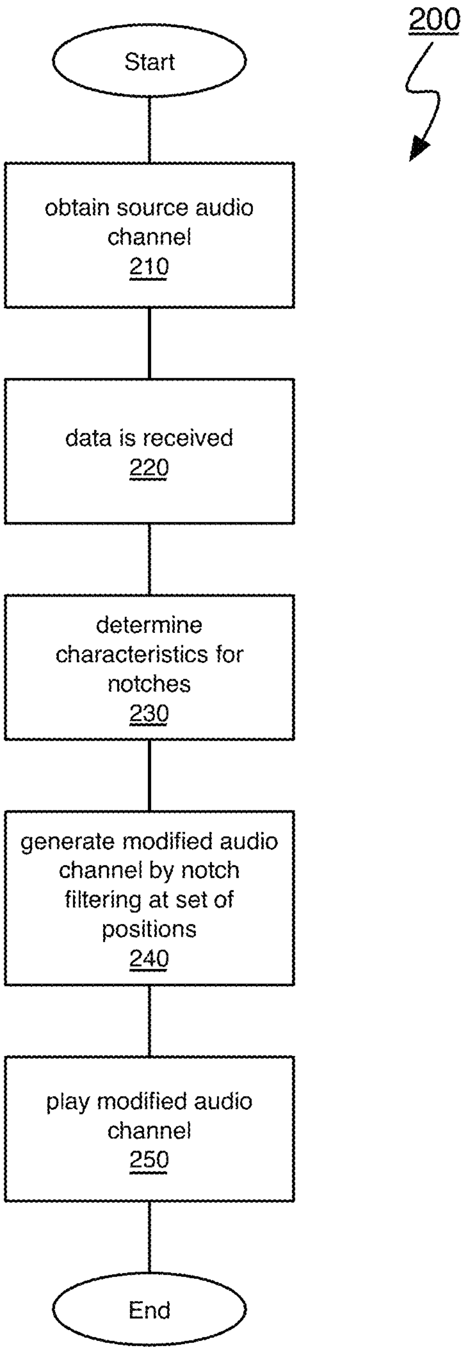
FIG. 4 is a flowchart of the general method of encoding data in audio via the computing device of FIG. 2.

The method 200 of encoding data in audio performed by the server 40 will now be discussed with reference to FIGS. 1, 2, and 4. The method 200 commences with the obtaining of a source audio channel (210). As used herein, an audio channel is a temporal sequence of tones, noises, etc. which can be either digital or analog in form. The source audio channel can be received or stored in the storage of the server 40 or can be streamed to the server 40. In some configurations, the source audio channel can be a musical composition. In other configurations, the source audio channel can be a human monologue or dialogue, or any other audio channel. Other types of suitable source audio channels will occur to those skilled in the art. A set of data to be encoded in the audio channel is then received (220). The set of data to be encoded can be stored in and retrieved from non-volatile storage 76, received via the I/O interface 68 or the network interface 72 from another computing device, etc. The data can be in one or more of a variety of formats, including, but not limited to, text (such as a message, a universal resource locator or other universal resource identifier, etc.), a binary file of text, image, video, or audio data, etc.

Next, at least one notch attribute is determined for each of a set of notches to be applied to the source audio channel to encode the data (230). The data is encoded via a pre-selected scheme/method, or via one of a set of pre-selected schemes/methods. The pre-selected scheme/method specifies how the data is to be encoded via the notch characteristics in the source audio channel. The at least one notch attribute for each of the set of notches can be varied to encode the data in the audio channel. Notch attributes that can be varied to encode the data can include, for example, temporal position, temporal duration, frequency position, frequency width, attenuation level, or any combination of these.

In this embodiment, data is encoded in the audio channel by varying the frequency positions and the temporal positions of the set of notches. The source audio channel is divided into time segments and the frequency domain from 20 Hz to 20 kHz is divided into frequency ranges.

Figure 5A:
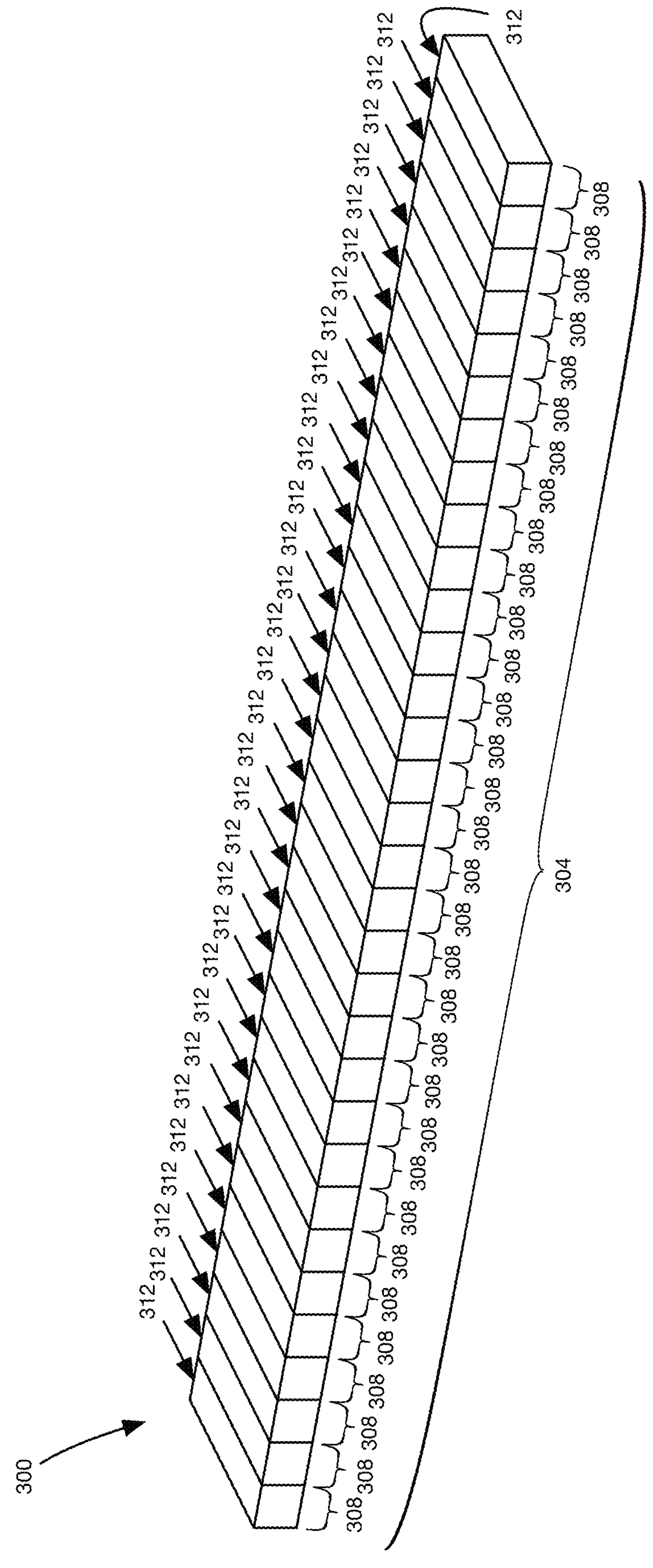
FIG. 5A is a schematic diagram of a frequency range of an audio channel, wherein the frequency range is divided into a set of sub-ranges having candidate positions at median locations in each sub-range.

FIG. 5A shows a time segment of a source audio channel 300, as a frequency domain 304 that is divided into a set of frequency ranges 308. In the illustrated embodiment, the frequency ranges 308 are equal in width, and a candidate position 312 for a notch is located at the median of each of the set of frequency ranges 308. As a result, the candidate positions 312 correspond to frequencies that are evenly spaced and are separated from each other by the width of the frequency ranges 308. The frequency range shown can represent a time segment of the source audio channel or the entire audio channel. It will be appreciated that the frequency ranges can be varied in width and that the candidate positions can be located at other positions within the frequency ranges.

In other embodiments, the set of candidate positions can be spaced along a frequency range and/or temporally spaced in any of a number of manners. Further, a subset of a set of candidate positions that are spaced along a frequency range and/or temporally spaced can be selected for the set of candidate positions. Where at least some of the candidate positions are spaced temporally, the temporal spacing between the candidate positions can be equal or non-equal. Where at least some of the candidate positions are spaced along a frequency range, the candidate positions can be spaced equally, spaced with increasing spacing between candidate positions as the frequencies increase, or in any other suitable manner.

Each time segment of the source audio channel can include candidate positions determined in the same or a different manner. Further, there may be multiple time segments, or the source audio channel may not be divided temporally.

Returning again to FIG. 4, upon the determination of the set of positions in the source audio channel, a modified audio channel is generated by notch filtering the source audio channel at the set of candidate positions selected at 230 (240). The server 40 generates a modified copy of the source audio channel by applying a notch filter at each of the determined candidate positions. In particular, in one embodiment, the notches are centred on the determined candidate positions. In other embodiments, the notches can be positioned in other manners relative to the candidate positions, such as commencing or ending at the selected candidate positions. Based on the above, it may be said that data is encoded by applying notch-filtering to the source audio channel to create a modified audio channel having the set of notches having the at least one notch attribute.

The attributes of the filtered notches can be selected independent of or at least partially based on characteristics of the source audio channel. For example, the amplitude of the notch filter applied can be fixed or follow a pre-defined pattern of amplitudes, and independent of the amplitude of the section of the audio channel to which it is applied. In another example, the amplitude of the notch filter can be adjusted at least partially based on the amplitude of the section of the source audio channel to which it is being applied. Both the frequency width, that is the range of frequencies for which amplitude is reduced, and the notch time duration can be constant or variable. For example, where the set of candidate positions at which notch filtering is performed is selected from a set of candidate positions that are equally spaced in frequency, it can be desirable to use notch filters that span a frequency range that is smaller than the frequency spacing between candidate positions to enable selection of adjacent candidate positions and identification of the individual notches. The frequency width, time duration, and amplitude of one or more of the notches created during the notch filtering can be varied.

In addition, where the pre-determined scheme/method for encoding the data is selected from a set of pre-determined schemes/methods, an identifier of the selected pre-determined scheme/method can be included in the modified audio channel via any suitable manner, such as one or more additional notches, audio tones, etc.

For example, this may mean encoding data by applying notch-filtering to the source audio channel to create a modified audio channel having the set of notches having the at least one notch attribute.

As will be appreciated, it can be desirable to include data duplication or validation features in the modified audio channel to mitigate audio infidelity in certain environments. The data can be repeated within the modified audio channel to ensure that it can be identified from a section of the modified audio channel. Further, validation features, such as checksums or the like, can be added to the data so that the data in the received modified audio channel can be validated.

The modified audio channel can be created and stored in storage or, alternatively, can be created in real time without storage of some or all of the modified audio channel.

Figure 5B:
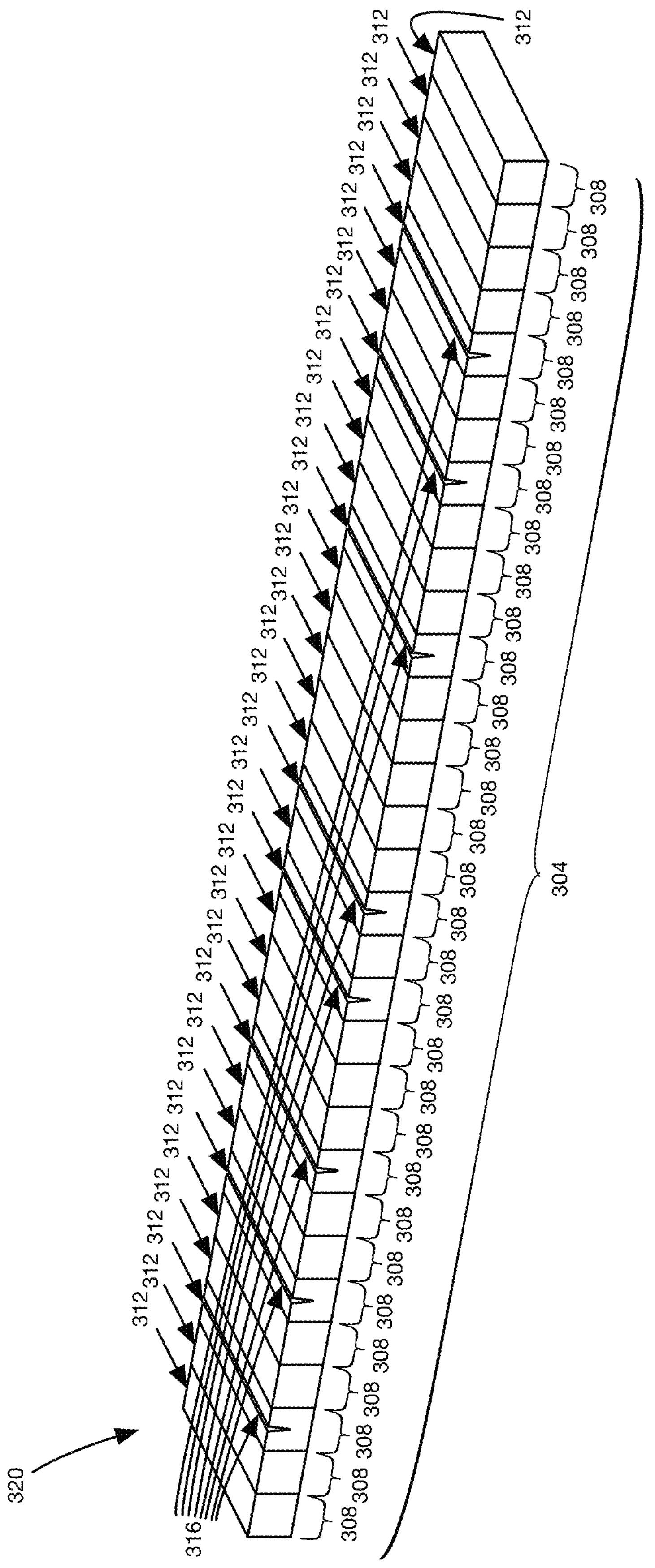
FIG. 5B shows the frequency range of FIG. 5A after notch filtering has been applied at a subset of the candidate positions in the frequency range.

FIG. 5B shows a time segment of the modified audio channel 320 generated by the server 40 by applying a notch filter to create notches 316 at the determined set of candidate positions within the corresponding time segment of the source audio channel.

Figure 6A:
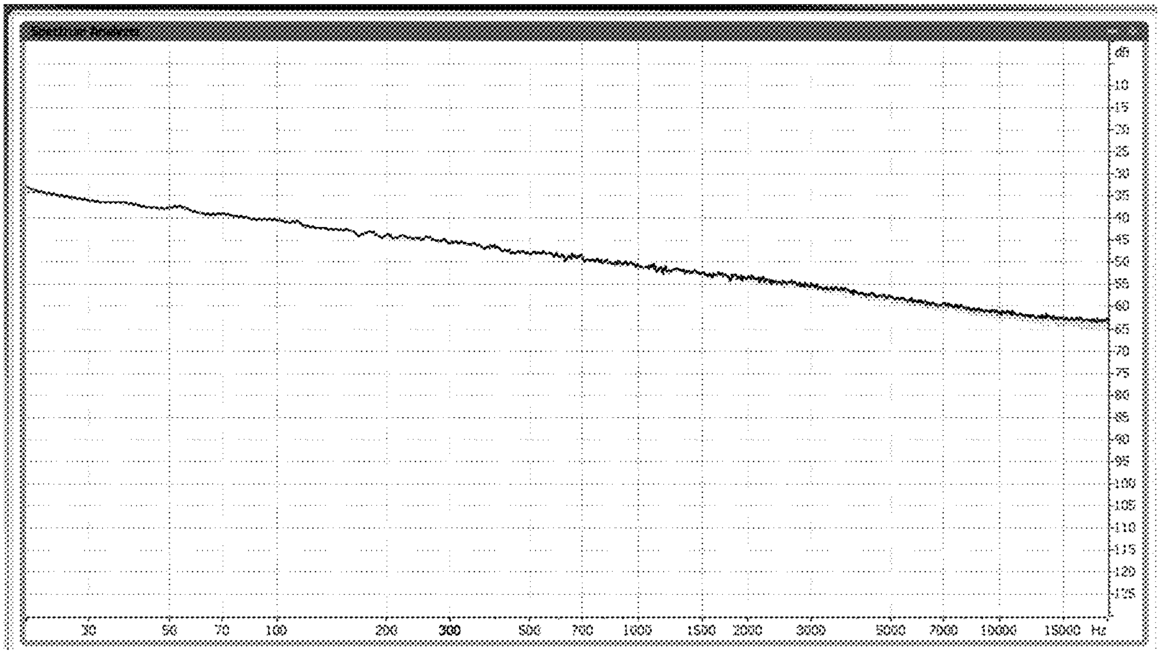
FIG. 6A shows a portion of a source audio channel along a range from 20 Hz to 20 kHz.

FIG. 6A shows a frequency range of another exemplary section of a source audio channel. In this particular illustrated embodiment, the section of the source audio channel has an amplitude that decreases somewhat as the frequency increases.

Figure 6B:
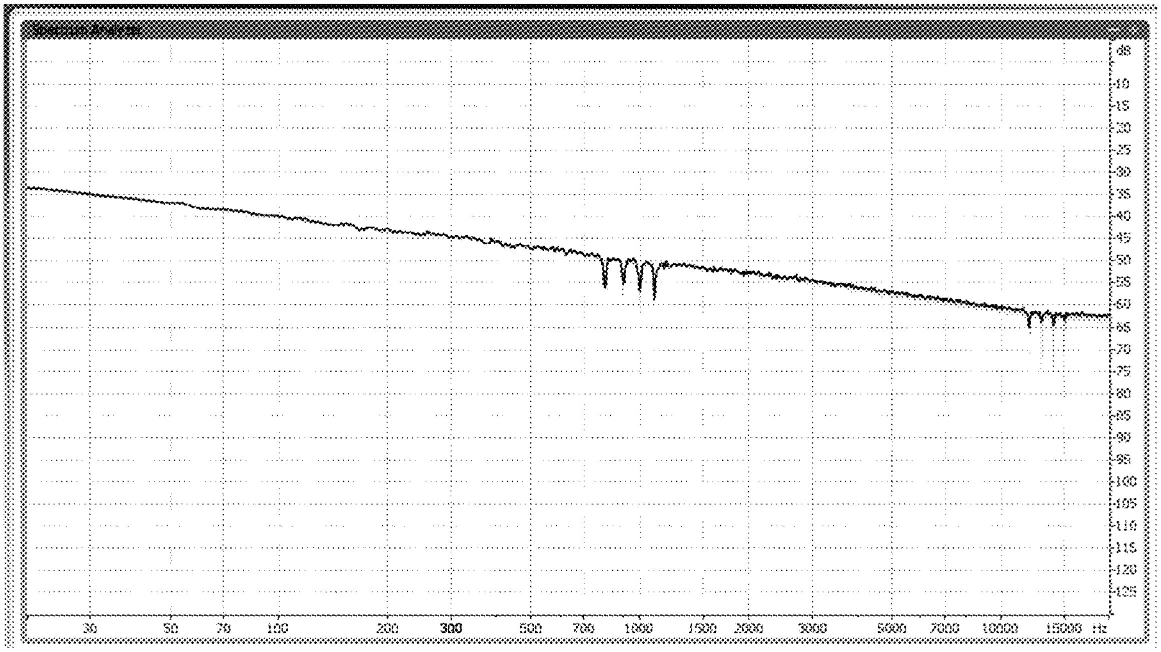
FIG. 6B shows a portion of a modified audio channel generated by notch filtering the source audio channel of FIG. 6A at a set of eight frequency positions.
Figure 6C:
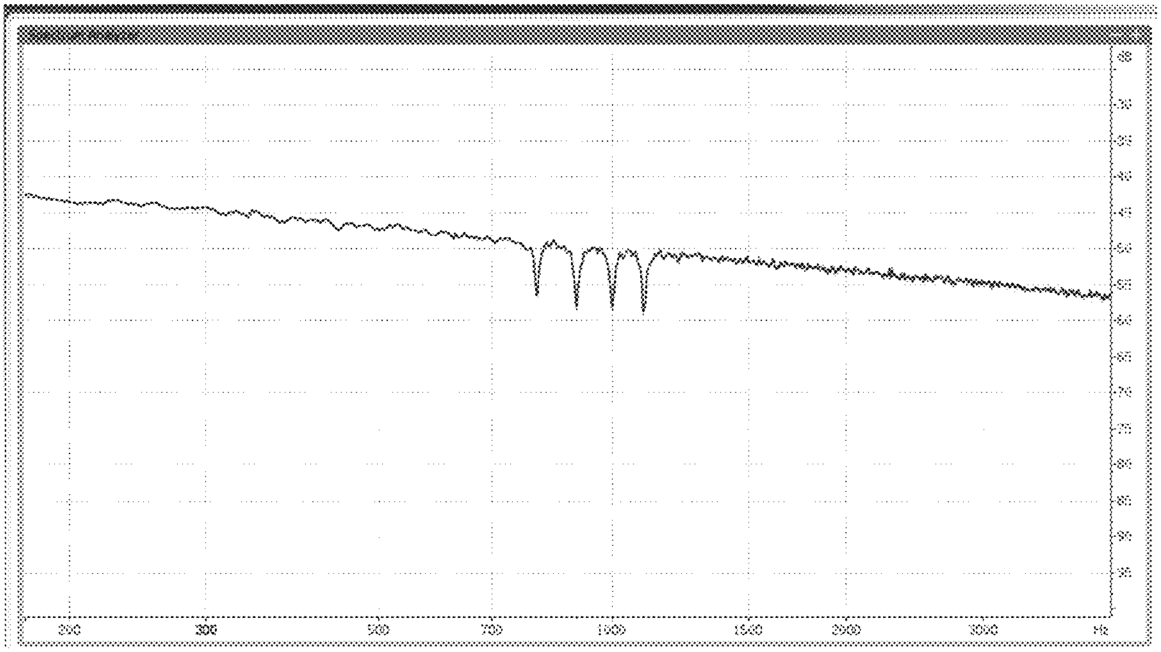
FIG. 6C shows a portion of a modified audio channel along a range from 150 Hz to 4 kHz generated by notch filtering the source audio channel of FIG. 6A at a set of four frequency positions.
Figure 6D:
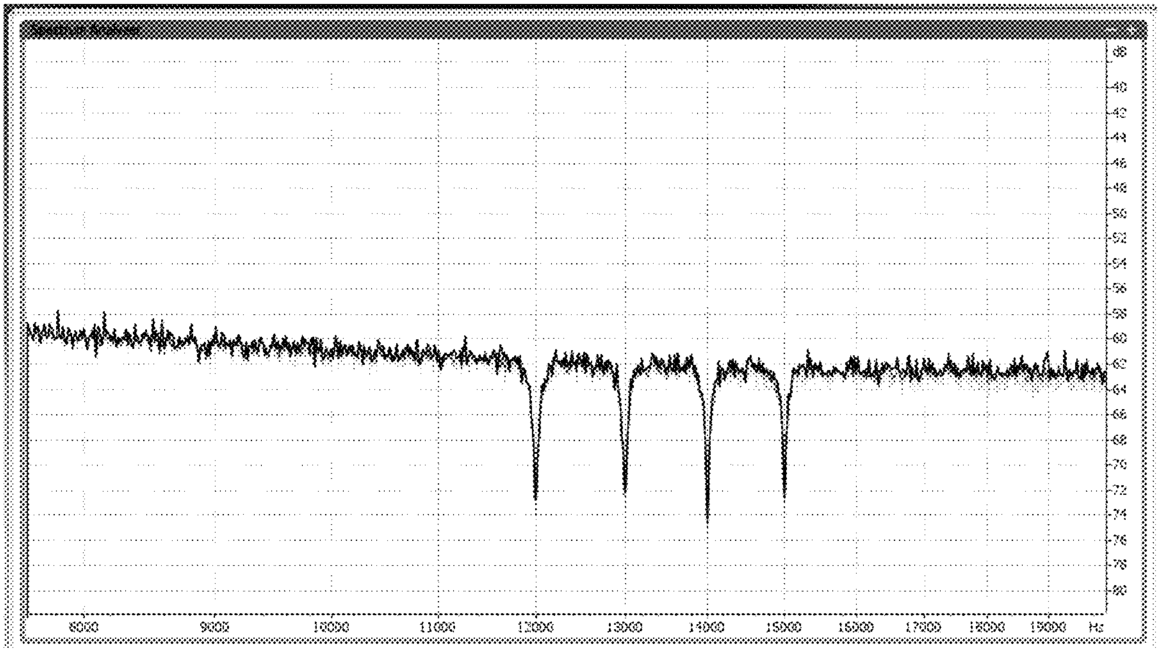
FIG. 6D shows a portion of a modified audio channel along a range from 7.5 kHz to 20 kHz generated by notch filtering the source audio channel of FIG. 6A at a set of four frequency positions.

FIG. 6B shows a section of a modified audio channel generated from the section of the source audio channel of FIG. 6A after notch filtering has been applied at eight frequencies: 800 Hz, 900 Hz, 1000 Hz, 1100 Hz, 12000 Hz, 13000 Hz, 14000 Hz, and 15000 Hz. FIGS. 6C and 6D show the frequency ranges around the first four frequencies and the last four frequencies, respectively, at which notch filtering was applied.

Referring again to FIG. 4, once some or all of the modified audio channel has been created, it is then played (250). Upon generating, or during generation of, the modified audio channel, the server 40 either transfers or streams one or more files with the modified audio channel to the television set 24 for playback via the loudspeaker 36. Alternatively, the server 40 can stream the audio channel via other means to the television set 24, such as an analog medium. The television set 24 can then perform any decoding of the modified audio channel, if needed, and play the modified audio channel. In addition or in the alternative, the modified audio channel can be stored in a memory (such as the non-volatile storage 70 of the server 40 or another memory) for future communication to the television set 24 for playback via the loudspeaker 36.

The mobile device 28 is sufficiently close to the television set 24 to receive and register the played modified audio channel via its microphone 56 and begins the process of decoding the set of data from the audio.

Figure 7:
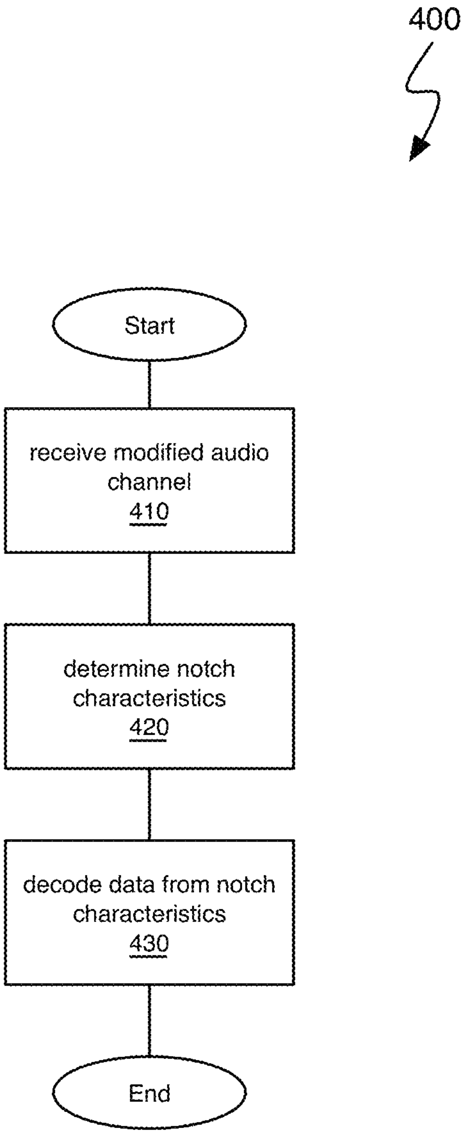
FIG. 7 is a flowchart of the general method of decoding data in audio encoded via the method of FIG. 4.

FIG. 7 shows the method 400 of decoding the data from the modified audio channel received by the mobile device 28. The modified audio channel is first received by the mobile device 28 (410). The mobile device 28 can commence registering the modified audio channel in any of a variety of manners. For example, the mobile device 28 can include a background listener application that is programmed to listen for a particular audio sequence, such as a sequence of three particular tones. The tones may be supersonic or subsonic. Upon registering the audio sequence, the listener application can commence registering audio. In another example, a user of the mobile device 28 can open an application that commences registering audio upon launch or upon activation of a control, such as a hardware button of the mobile device 28 or a button in the user interface of the application.

After some or all of the modified audio channel is received, the positions at which notch filtering has been performed are detected and their characteristics are determined (420). The notches 316 created by the notch filtering are preferably distinguishable by one or more characteristics, such as their time duration, amplitude, frequency width, etc. Thus, by analyzing the modified audio channel, the notches can be identified based on these characteristics.

Upon identification of the positions of the notches 316, other characteristics used to encode data in the modified audio channel 324, if any, can be determined, such as time duration, frequency width, amplitude, etc.

Upon determining the characteristics of each of the notches 316 detected in the modified audio channel, the data is decoded from the notch characteristics (430). The data is decoded from the notch characteristics using the pre-determined scheme/method. Where the pre-determined scheme/method used to encode the data in the modified audio channel is selected from a set of pre-determined schemes/methods, the selected pre-determined scheme/method can be determined from the modified audio channel.

If data duplication or validation is employed in the modified audio channel 324, this can be used to validate the data received and determine the data.

Upon decoding the data, the data can be passed to an assigned application, such as a web browser, a messaging app, etc. Alternatively, the data can be placed on the clipboard of the mobile device 28 so that the data can be used in a user-selected application on the mobile device 28. In a preferred embodiment, the data is a uniform resource locator that is then passed to a web browser for retrieving an associated resource on the Internet, such as an information page for a product being presented on the display 32 of the television set 24 during playback of the modified audio channel.

Figure 8:
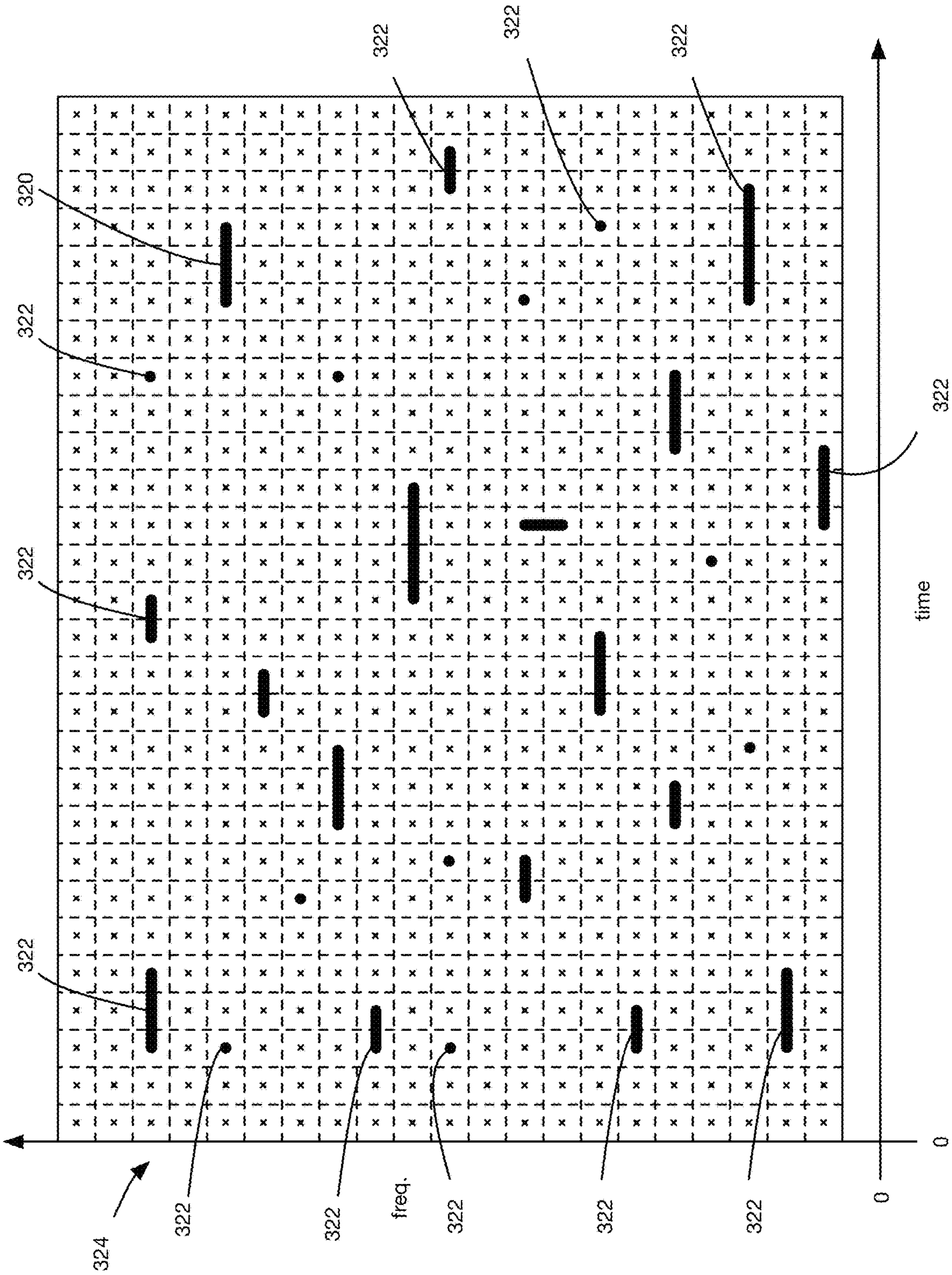
FIG. 8 is a schematic diagram of a set of frequency and time ranges, candidate positions in each frequency-time range, and actual positions for notch filtering selected to encode data.

FIG. 8 shows a mapping of the positioning, time duration, and frequency width of notches 322 in a portion of a modified audio channel 324. As can be seen, the time and frequency of the position of each notch 322 can be varied, as can the time duration and frequency width of each notch 322. While not shown, the amplitude can be varied between notches as part of the pre-determined scheme/method.

In another embodiment, the source audio channel can be notch filtered to identify portions of the modified audio channel that have been modified in other ways to encode data. In one particular example, the notches are used as anchor points to identify parts of the modified audio channel that have been time-shifted relative to the source audio channel.

Figure 9:
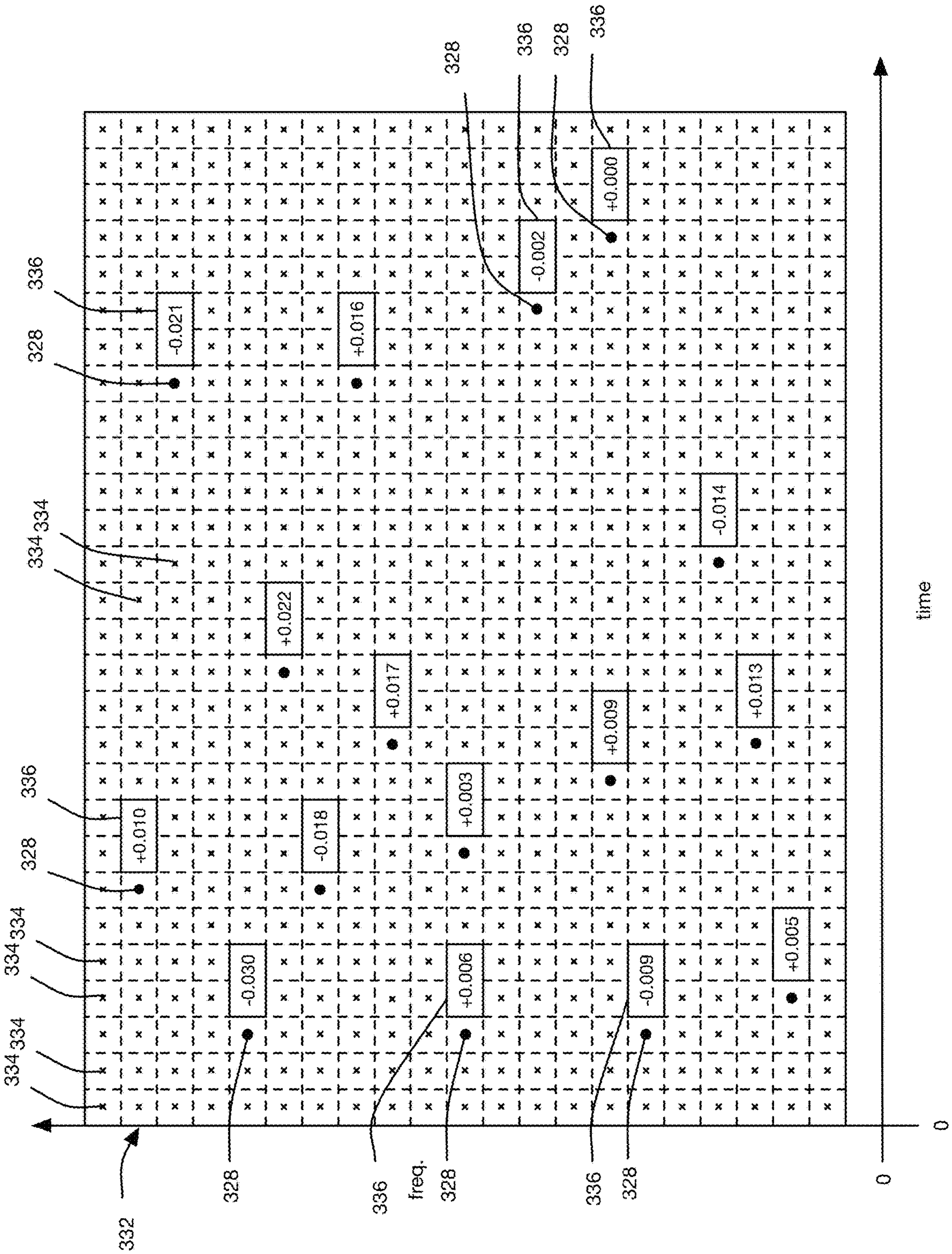
FIG. 9 is a schematic diagram of a set of frequency and time ranges, candidate positions in each frequency-time range, actual positions for notch filtering selected to encode data, and time adjustments applied to time and frequency segments adjacent to the notches.

FIG. 9 shows a mapping of the temporal and frequency positioning of notches 328 in a portion of a modified audio channel 332 selected from a set of candidate positions 334. As can be seen, the time and frequency of the position of each notch 328 can be varied and identifies a time and frequency segment 336 of the modified audio channel 332 that is temporally shifted relative to the corresponding time and frequency segment of the source audio channel. The time and frequency segments 336 that are temporally shifted can be a pre-determined time length and frequency width. The temporal shift is used to encode data, and can be either positive, negative, or zero.

Figure 10:
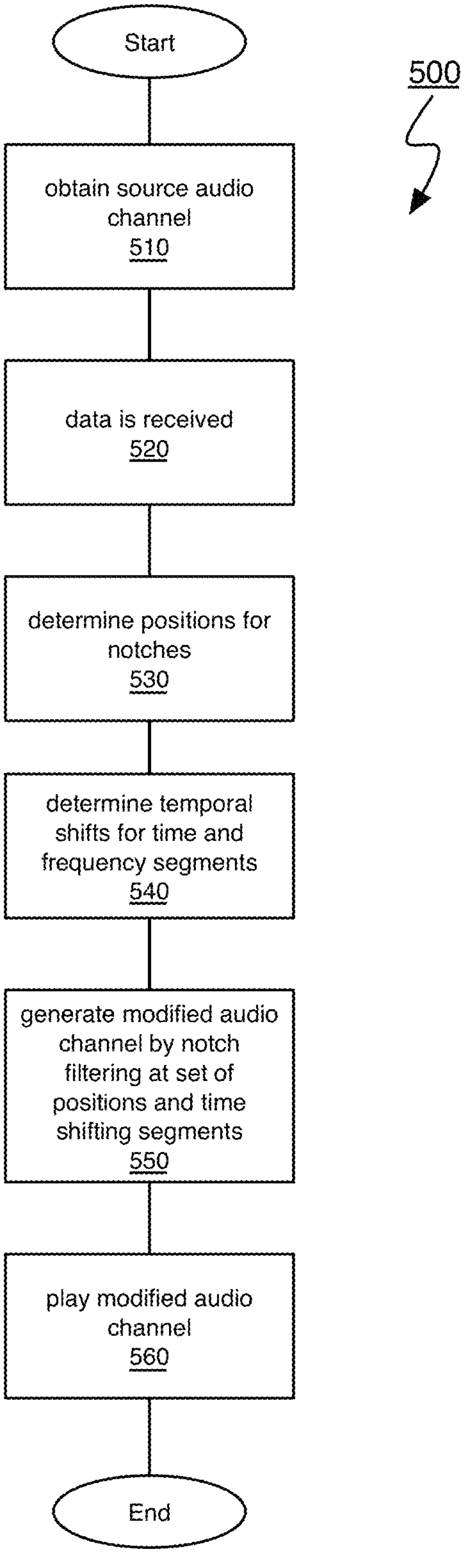
FIG. 10 is a flowchart of the general method of encoding data in an audio channel as shown in FIG. 9.

FIG. 10 shows a general method 500 of encoding data as is shown in FIG. 9. The method 500 commences with the obtaining of a source audio channel (510). Data to be encoded is received (520). A set of positions for notches is then determined (530). The positions of the set of notches are determined so that they are adjacent time and frequency sections whose time shift would be detectable by a computing device if temporally shifted. Next, a temporal shift for each time and frequency segment of the source audio channel adjacent to each notch position determined at 530 is determined (540). The data encoding is particularly done via the determination of the temporal shifts to the time and frequency segments. A modified audio channel is then generated by notch filtering at the positions determined at 530 and then by temporally shifting the time and frequency segments by the temporal shifts determined at 540 (550). Once the modified audio channel is generated at 550, it is then played back (560).

Figure 11:
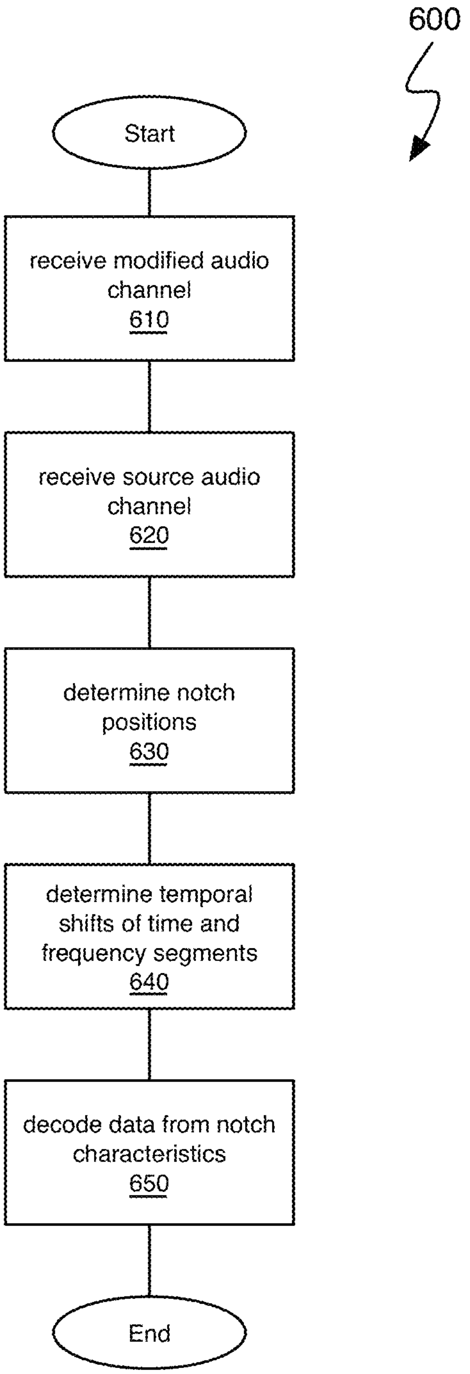
FIG. 11 is a flowchart of the general method of decoding data in audio channels encoded via the method of FIG. 10.

FIG. 11 shows a general method 600 of decoding data encoded using the method of FIG. 10. The modified audio channel is received by a computing device (610). Next, the source audio channel is received (620). The source audio channel can be stored by the decoding computing device, requested by the decoding computing device upon identifying the audio channel, etc. The positions of the notches are then determined (630). The notches are readily identified in the modified audio channel. Once the notch positions are identified, the time and frequency segments adjacent to each notch in the modified audio channel can be compared to the corresponding time and frequency segment of the source audio channel to determine a time shift for each (640). The notch filters and the time shift of the time and frequency segments are preferably small enough to be difficult to notice to the human ear. Using the temporal shifts of the time and frequency segments, the data encoded in the modified audio channel can then be decoded (650).

In other embodiments, the time and frequency segments adjacent to notches can be transformed in other ways. For example, the time and frequency segments can additionally or alternatively have their frequency shifted and/or their amplitude adjusted.

It will be appreciated that the system encoding the data in the audio channel can be remote from the audio transducer upon which the resulting composite audio channel is played. For example, the television set may receive the composite audio channel together with the images to be presented on the display from another computing device such as a local or remote server. Alternatively, the same computing device can perform both the encoding of the data and the playback of the modified audio channel.

In a further embodiment, a playback computing device can be provided an analog modified audio channel that can decode data from the modified audio channel and present data on a screen during playback of the modified audio channel.

Computer-executable instructions for implementing the encoding and/or decoding of data in audio on a computer system could be provided separately from a computing device, for example, on a computer-readable medium (such as, for example, an optical disk, a hard disk, a USB drive or a media card) or by making them available for downloading over a data communications network, such as the Internet.

While the encoding and decoding computing devices are shown as single physical computing devices, it will be appreciated that the computer devices can include two or more physical computing devices in communication with each other.

Although specific advantages have been enumerated above, various embodiments may include some, none, or all of the enumerated advantages.

Persons skilled in the art will appreciate that there are yet more alternative implementations and modifications possible, and that the above examples are only illustrations of one or more implementations. The scope, therefore, is only to be limited by the claims appended hereto and any amendments made thereto.

LIST OF REFERENCE NUMERALS

20 system
24 television set
28 mobile device
32 display
36 loudspeaker
40 server
44 Internet
48 touchscreen display
52 loudspeaker
56 microphone
60 processor
64 RAM
68 I/O interface
72 network interface
76 non-volatile storage
80 local bus
84 processor
88 RAM
92 I/O interface
96 network interface
100 non-volatile storage
104 local bus
200 method
210 obtain source audio channel
220 data is received
230 determine set of positions in source audio channel
240 generate modified audio channel by notch filtering at set of positions
250 play modified audio channel
260 optionally simultaneously play source audio channel
300 source audio channel
304 frequency range
308 sub-range
312 candidate position
316 notch
320 modified audio channel
322 notch
324 modified audio channel
328 notch
332 modified audio channel
336 time and frequency segment
400 method
410 receive modified audio channel
420 determine notch characteristics
430 decode data from notch characteristics
500 method
510 obtain source audio channel
520 data is received
530 determine positions for notches
540 determine temporal shifts for time and frequency segments
550 generate modified audio channel by notch filtering at set of positions and time shifting segments
560 play modified audio channel
600 method
610 receive modified audio channel
620 receive source audio channel
630 determine notch positions
640 determine temporal shifts of time and frequency segments
650 decode data from notch characteristics

What is claimed is:

1. A method for encoding data in an audio channel, comprising:

modifying a source audio channel by temporally shifting time and frequency segments of the source audio channel relative to original temporal positions of the time and frequency segments to encode data therein, thereby generating a modified audio channel, the data being encoded in the temporally shifted time and frequency segments; and for each temporally shifted time and frequency segment of the modified audio channel, applying notch filtering to the source audio channel to create a respective notch in the modified audio channel adjacent to and separate from the temporally shifted time and frequency segment, the respective notch defining a location of the temporally shifted time and frequency segment within the modified audio channel.

2. The method of claim 1, wherein, during the modifying, each of the temporally shifted time and frequency segments is temporally shifted by a positive or a negative amount of time.

3. The method of claim 1, wherein the temporally shifted time and frequency segments each have a pre-determined time length and frequency width.

4. The method of claim 1, wherein both a direction of and a magnitude of the temporal shifting of the time and frequency segments of the source audio channel relative to the original temporal positions of the time and frequency segments is used to encode the data.

5. The method of claim 1, wherein a position of each respective notch is selected from a set of candidate positions.

6. The method of claim 1 further comprising:

receiving the modified audio channel including the respective notches;

obtaining the source audio channel from which the modified audio channel was generated;

identifying positions of the respective notches in the received modified audio channel;

for each identified respective notch, comparing a time and frequency segment of the received modified audio channel adjacent to the respective notch to a corresponding time and frequency segment of the source audio channel to determine a temporal shift of the time and frequency segment; and decoding data encoded in the modified audio channel based on the determined temporal shifts.

7. A system for encoding data in audio, comprising:

at least one processor;

a storage storing computer-executable instructions that, when executed by the at least one processor, cause the system to:

modifying a source audio channel by temporally shifting time and frequency segments of the source audio channel relative to original temporal positions of the time and frequency segments to encode data therein, thereby generating a modified audio channel, the data being encoded in the temporally shifted time and frequency segments; and for each temporally shifted time and frequency segment of the modified audio channel, applying notch filtering to the source audio channel to create a respective notch in the modified audio channel adjacent to and separate from the temporally shifted time and frequency segment, the respective notch defining a location of the temporally shifted time and frequency segment within the modified audio channel.

8. The system of claim 7, wherein, during the modifying, each of the temporally shifted time and frequency segments is temporally shifted by a positive or a negative amount of time.

9. The system of claim 7, wherein the temporally shifted time and frequency segments each have a pre-determined time length and frequency width.

10. The system of claim 7, wherein a position of each respective notch is selected from a set of candidate positions.

11. A method for decoding data encoded in a modified audio channel, comprising:

receiving the modified audio channel;

obtaining a source audio channel from which the modified audio channel was generated;

identifying positions of a set of notches in the modified audio channel;

for each identified notch, comparing a time and frequency segment of the modified audio channel adjacent to the notch to a corresponding time and frequency segment of the source audio channel to determine a temporal shift of the time and frequency segment; and decoding data encoded in the modified audio channel based on the determined temporal shifts, wherein the positions of the notches determine which time and frequency segments of the modified audio channel are compared to the source audio channel.

12. The method of claim 11, wherein, for each identified notch, the temporal shift is determined by comparing a temporal location of the time and frequency segment of the modified audio channel adjacent to the notch to a temporal location of the corresponding time and frequency segment of the source audio channel.

13. The method of claim 11, wherein each temporal shift is positive, negative or zero.

14. A system for decoding data encoded in a modified audio channel, comprising:

at least one processor;

at least one audio transducer operably connected to the at least one processor a storage storing computer-executable instructions that, when executed by the at least one processor, cause the system to perform the method of claim 11.

* * * * *